US012720588B2

(12) United States Patent
Boger et al.

(10) Patent No.: US 12,720,588 B2
(45) Date of Patent: Aug. 25, 2026

(54) LOW LATENCY WIRELESS COMMUNICATION

(71) Applicant: Apple Inc., Cupertino, CA (US)

(72) Inventors: Yoel Boger, Shoham (IL); Oren Shani, Saratoga, CA (US); Jerome C. Tu, Saratoga, CA (US); Sungho Yun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 17/480,125

(22) Filed: Sep. 20, 2021

(65) Prior Publication Data

US 2023/0086527 A1 Mar. 23, 2023

(51) Int. Cl.

| | |
|---|---|
| ***H04W 40/00*** | (2009.01) |
| ***H04B 1/38*** | (2015.01) |
| ***H04B 7/005*** | (2006.01) |
| ***H04B 7/06*** | (2006.01) |
| ***H04L 1/00*** | (2006.01) |
| ***H04L 1/1867*** | (2023.01) |
| ***H04L 5/00*** | (2006.01) |
| ***H04W 36/30*** | (2009.01) |
| ***H04W 40/12*** | (2009.01) |
| ***H04W 72/04*** | (2023.01) |
| ***H04W 72/566*** | (2023.01) |

(52) U.S. Cl.

CPC ................................ *H04W 72/566* (2023.01)

(58) Field of Classification Search

CPC ............ H04L 12/1881; H04L 47/2441; H04L 43/026; H04W 84/12; H04W 72/1273; H04W 74/006; H04W 72/1268; H04W 72/1263; H04W 88/08; H04W 52/0206

USPC ............................................ 370/252, 230.1

See application file for complete search history.

(56) References Cited

U.S. PATENT DOCUMENTS

2009/0129304 A1* 5/2009 Kim ..................... H04L 5/0007 370/311

2010/0008332 A1* 1/2010 Balachandran ....... H04L 5/0091 370/336

(Continued)

OTHER PUBLICATIONS

Coleman, "802.11ax Framc Aggregation Enhancements," Mar. 2021, retrieved from https://www.extremenetworks.com/extreme-networks-blog/802-1 lax-frame-aggregation-enhancements/, 6 pages.

*Primary Examiner* — Marcus Smith
*Assistant Examiner* — Jason A Harley
(74) *Attorney, Agent, or Firm* — BAKERHOSTETLER

(57) ABSTRACT

The subject disclosure provides systems and methods for low-latency point-to-point communication between electronic devices. In one or more implementations, low latency can be achieved by including data in transmission units, in order of priority up to a maximum duration for the transmission unit. In an example in which the communication occurs over a WiFi channel, the transmission unit may be a multi-TID AMPDU, and the priority may be based on a Quality of Service (QoS) category as identified by the traffic identifier (TID). The communication may be exchanged using a periodic access window that can be adaptively offset, to efficiently share bandwidth with other device pairs on the same wireless channel. Base and client devices can be time synchronized, and transmission opportunity (TXOP) bursting can be allowed, in one or more implementations.

17 Claims, 8 Drawing Sheets

(56) References Cited

U.S. PATENT DOCUMENTS

| | | | | |
|---|---|---|---|---|
| 2011/0317633 | A1* | 12/2011 | Tan | H04L 27/2607 370/329 |
| 2013/0250969 | A1* | 9/2013 | Hui | H04L 5/0094 370/437 |
| 2014/0219110 | A1* | 8/2014 | Du | H04W 24/02 370/252 |
| 2015/0055516 | A1* | 2/2015 | Smadi | H04W 72/1215 370/280 |
| 2015/0078356 | A1* | 3/2015 | Kwon | H04W 74/0816 370/338 |
| 2015/0117427 | A1* | 4/2015 | Park | H04L 47/628 370/338 |
| 2015/0146648 | A1* | 5/2015 | Viger | H04L 1/1685 370/329 |
| 2015/0365830 | A1* | 12/2015 | Wei | H04W 24/10 370/280 |
| 2016/0330755 | A1* | 11/2016 | Ding | H04W 72/23 |
| 2017/0171069 | A1* | 6/2017 | Oren | H04W 28/065 |
| 2017/0264560 | A1* | 9/2017 | Heine | H04L 69/18 |
| 2017/0311318 | A1* | 10/2017 | Li | H04W 74/06 |
| 2018/0027453 | A1* | 1/2018 | Viger | H04W 74/0816 370/336 |
| 2018/0332627 | A1* | 11/2018 | Chitrakar | H04W 74/0833 |
| 2019/0045537 | A1 | 2/2019 | Seok et al. | |
| 2019/0050933 | A1* | 2/2019 | Yoo | G06Q 20/385 |
| 2022/0110053 | A1* | 4/2022 | Chu | H04W 52/0216 |
| 2022/0256592 | A1* | 8/2022 | Changlani | H04W 74/006 |

* cited by examiner

LOW LATENCY WIRELESS COMMUNICATION

TECHNICAL FIELD

The present description relates generally to wireless communication, including, for example, low latency wireless communication for electronic devices.

BACKGROUND

Electronic devices often communicate over wireless networks using WiFi protocols defined by the 802.11 standards.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject technology provides for low latency wireless communication, such as point-to-point wireless communication between a pair of devices over a wireless channel. In one or more implementations, the wireless channel is a WiFi channel, and the low latency is achieved by ordering data in a physical layer protocol data unit (PPDU) by Quality of Service (QoS) priority. In one or more implementations, the duration of each PPDU is limited to a maximum duration, and the PPDUs are transmitted using a periodic access window. The periodic access window may have a fixed duration and an adjustable offset of the entire duration, so that multiple device pairs can be self-synchronized on the same wireless channel (e.g., without communication between the devices of different pairs and without a central scheduling authority).

Figure 1:
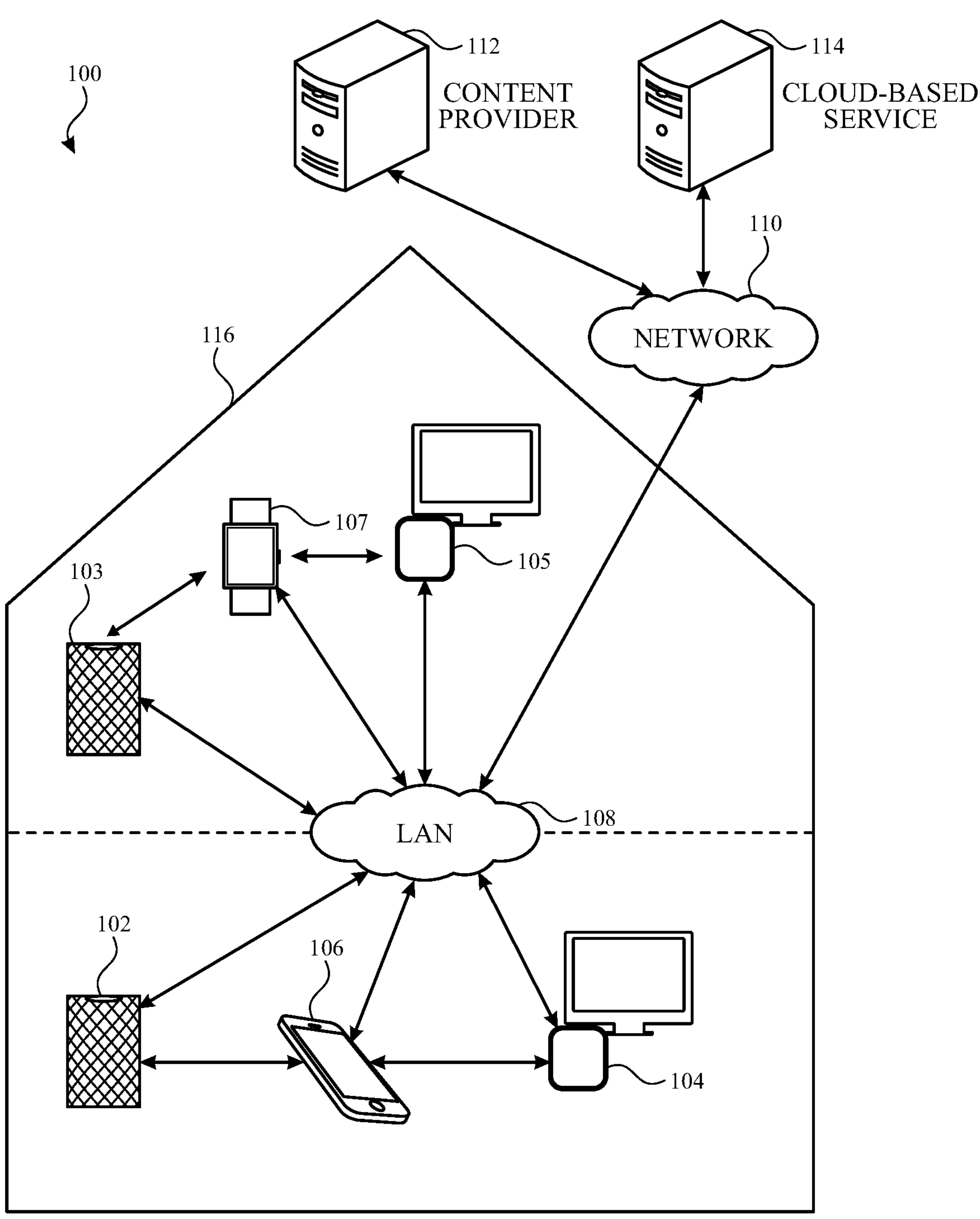
FIG. 1 illustrates an example network environment in accordance with one or more implementations.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103, 104, 105, 106 and 107 (hereinafter "the electronic devices 102-107"), a local area network ("LAN") 108, a network 110, and one or more content providers such as content provider 112 and one or more cloud-based service(s) such as cloud-based service 114.

In one or more implementations, the electronic devices 102-107 may form part of a connected home environment 116, and the LAN 108 may communicatively (directly or indirectly) couple any two or more of the electronic devices 102-107 within the connected home environment 116. Moreover, the network 110 may communicatively (directly or indirectly) couple any two or more of the electronic devices 102-107 with the content provider 112 and/or the cloud-based service 114, for example, in conjunction with the LAN 108. As illustrated in FIG. 1, device pairs such as electronic device 107 and electronic device 105, electronic device 107 and electronic device 103, electronic device 106 and electronic device 102, and/or electronic device 106 and electronic device 104 (as examples), may communicate directly (e.g., over a point-to-point WiFi channel) in some scenarios, such as when the devices of the device pairs are in proximity to each other. In one or more implementations, one or more of the device pairs may communicate over the same wireless channel, as described in further detail hereinafter. Although the electronic devices 102-107 are depicted in FIG. 1 as forming a part of a connected home environment in which all of the devices are connected to the LAN 108, one or more of the electronic devices 102-107 may not be a part of the connected home environment and/or may not be connected to the LAN 108 at one or more times.

In one or more implementations, the LAN 108 may include one or more different network devices/network medium and/or may utilize one or more different wireless and/or wired network technologies, such as Ethernet, optical, WiFi, Bluetooth, Zigbee, Powerline over Ethernet, coaxial, Ethernet, Z-Wave, cellular, or generally any wireless and/or wired network technology that may communicatively couple two or more devices.

In one or more implementations, the network 110 may be an interconnected network of devices that may include, and/or may be communicatively coupled to, the Internet. For explanatory purposes, the network environment 100 is illustrated in FIG. 1 as including electronic devices 102-107, and the servers 112-114; however, the network environment 100 may include any number of electronic devices and any number of servers.

One or more of the electronic devices 102-107 may be, for example, a portable computing device such as a laptop computer, a smartphone, a smart speaker, a peripheral device (e.g., a digital camera, headphones), a digital media player, a tablet device, a wearable device such as a smartwatch or a band, a connected home device, such as a wireless camera, a router and/or wireless access point, a wireless access device (e.g., a door lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, such as WLAN radios, WiFi radios, cellular radios, Bluetooth radios, Zigbee radios, near field communication (NFC) radios, and/or other wireless radios.

By way of example, in FIG. 1 each of the electronic devices 102-103 is depicted as a smart speaker, the electronic device 106 is depicted as a smartphone, the electronic device 107 is depicted as a smartwatch, and each of the electronic devices 104 and 105 is depicted as a digital media player (e.g., configured to receive digital data such as music and/or video and stream it to a display device such as a television or other video display, and/or to one of the other electronic devices). In one or more implementations, one or more of the electronic devices 104 and 105 may be integrated into or separate from a corresponding display device. One or more of the electronic devices 102-107 may be, and/or may include all or part of, the device discussed below with respect to FIG. 2, and/or the electronic system discussed below with respect to FIG. 9.

One or more of the servers for content provider 112 and/or cloud-based service 114 may be, and/or may include all or part of the device discussed below with respect to FIG. 2, and/or the electronic system discussed below with respect to FIG. 9. Each of the content provider 112 and/or cloud-based service 114 may include one or more servers, such as a cloud of servers. For explanatory purposes, a single server is shown and discussed with respect to various operations for each of the content provider 112 and/or cloud-based service 114. However, these and other operations discussed herein may be performed by one or more servers, and each different operation may be performed by the same or different servers. Content provider 112 may provide access to content such as streaming content (e.g., video content, audio content) or other subscription-based content (e.g., electronic book content or the like) to user devices (e.g., to one or more of the electronic devices 102-107). Cloud-based service 114 may provide access to cloud-based storage, content (e.g., photos, videos, calendar information, etc.) stored in the cloud-based storage, applications (e.g., gaming applications, streaming applications, and/or any other application) to user devices (e.g., to one or more of the electronic devices 102-107).

Figure 2:
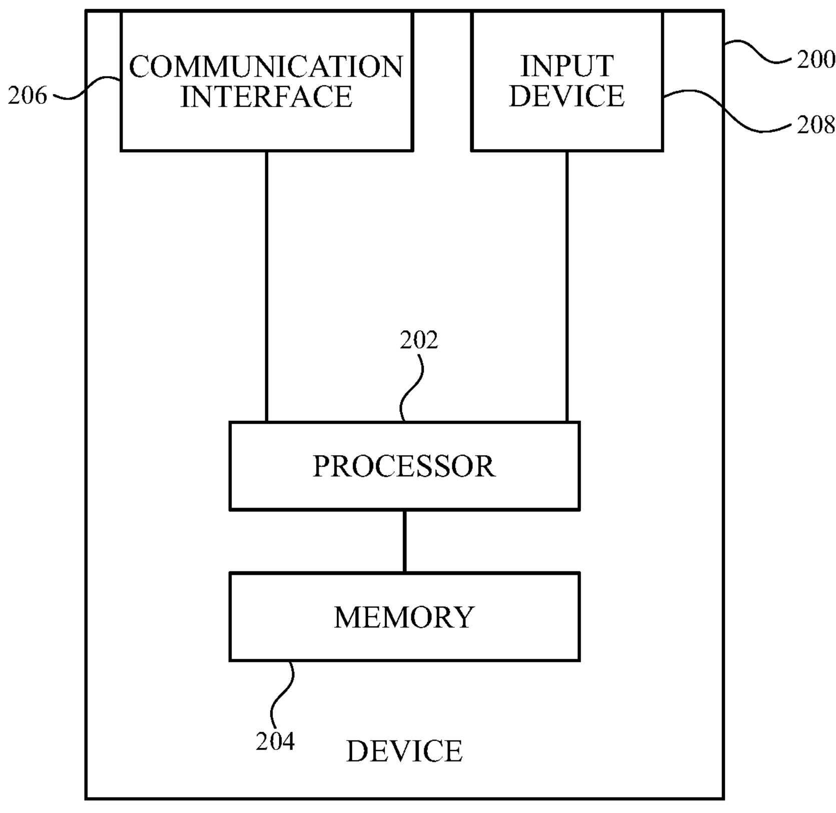
FIG. 2 illustrates an example device that may implement a system for low latency wireless communication in accordance with one or more implementations.

FIG. 2 illustrates an example device that may implement a system for low latency wireless communication in accordance with one or more implementations. For example, the device 200 of FIG. 2 can correspond to any of the electronic devices 102-107 and/or the servers of content provider 112 and/or cloud-based service 114 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206 and an input device 208. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-107, the memory 204 may store applications and/or services for generating data streams and/or for generating and providing communication to others of the electronic devices 102-107 and/or for receiving and/or processing communication from others of the electronic devices 102-107. The input device 208 may include suitable logic, circuitry, and/or code for capturing input, such as audio input (e.g., voice input), video input, remote control input, touchscreen input, keyboard input, etc.

The communication interface 206 may include suitable logic, circuitry, and/or code that enables wired or wireless communication, such as between any of the electronic devices 102-107 and/or the servers 112-114 over the network 110 (e.g., directly and/or in conjunction with the LAN 108). The communication interface 206 may include, for example, one or more of a Bluetooth communication interface, a cellular interface, an NFC interface, a Zigbee communication interface, a WLAN communication interface, a WiFi communication interface, a USB communication interface, or generally any communication interface.

In one or more implementations, one or more of the processor 202, the memory 204, the communication interface 206, the input device 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
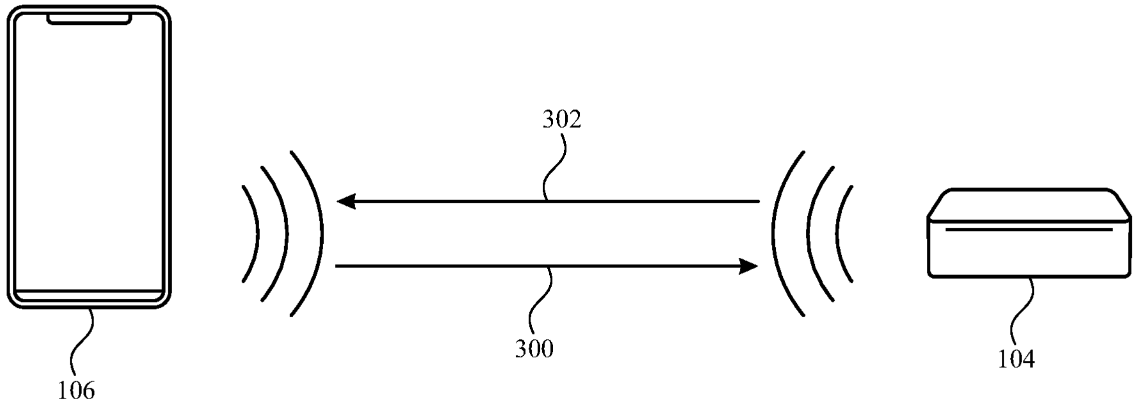
FIG. 3 illustrates an example pair of devices in wireless communication in accordance with one or more implementations.

FIG. 3 illustrates an example in which electronic device 106 and electronic device 104 are exchanging communication in accordance with aspects of the subject technology. For example, the electronic device 106 may generate and transmit a downlink (DL) communication 300 to the electronic device 104, and the electronic device 104 may respond with an uplink (UL) communication 302. In one or more implementations, the DL communication 300 may include one or more frames of data, and the UL communication 302 may include an acknowledgement and/or one or more frames of additional data.

In one or more implementations, the electronic device 104 and the electronic device 106 may communicate using WiFi protocols on a WiFi channel (e.g., one or more channels in a 2.4 GHz frequency band and/or one or more channels in a 5 GHz frequency band). In one or more examples described herein, the electronic device 106 may act as a base device and contend for the WiFi channel (e.g., using an enhanced distributed channel access (EDCA) procedure or other contention procedure), and the electronic device 104 may act as a client device that responds to communication (e.g., including a response direction grant (RDG) trigger) from the electronic device 106 over the WiFi channel, in some use cases. However, this is merely illustrative, and in other use cases, the electronic device 104 may act as a base device that contends for the WiFi channel, and the electronic device 106 can act as a client device that responds to communication from the electronic device 104.

During a time when the electronic device 106 and electronic device 104 are in communication as shown in FIG. 3, the electronic device 106 and electronic device 104 may be referred to as a device pair. In one or more use cases, one or more additional device pairs may exchange wireless (e.g., WiFi) communication over the same wireless channel (e.g., interleaved with the DL communication 300 and the UL communication 302 of the device pair formed by the electronic device 106 and the electronic device 104).

In one or more implementations, the electronic device 106 and the electronic device 104 may generate and transmit the respective the DL communication 300 and UL communication 302 in accordance with one or more features of the WiFi (e.g., 802.11) protocols. For example, the DL communication 300 and/or the UL communication 302 may include a media access control (MAC) service data unit (MSDU) that includes frame data. The MSDU can be combined with a frame header to form a MAC protocol data unit (MPDU), which can be combined with a physical layer (PHY) preamble and a physical layer header to form a physical protocol data unit (PPDU) for transmission. In one or more implementations, multiple frames (e.g., multiple MSDUs) can be combined to form an Aggregate MAC Service Data Unit (A-MSDU) (which may also be also referred to as an MPDU) in which each of several included frames have the same type (e.g., the same Quality of Server (QoS) access category). In one or more implementations, multiple AMSDUs can be combined (e.g., along with a header and/or other information), into a single Aggregate MAC Protocol Data Unit (AMPDU) in which each of several included frames have the same type (e.g., QoS access category).

In one or more implementations, the DL communication 300 and/or the UL communication 302 may include AMPDUs that include multiple frames having multiple different types (e.g., multiple different QoS access categories), which can be sent with a multi-Traffic Identifier (m-TID) that identifies the various types, and thus forming a transmission unit in the form of an m-TID AMPDU. However, in some use cases, WiFi communication using standard m-TID AMPDUs can be inefficient, such as for latency-sensitive applications involving multiple devices on the same medium (e.g., RF channel) and with different Quality of Service requirements.

Figure 4:
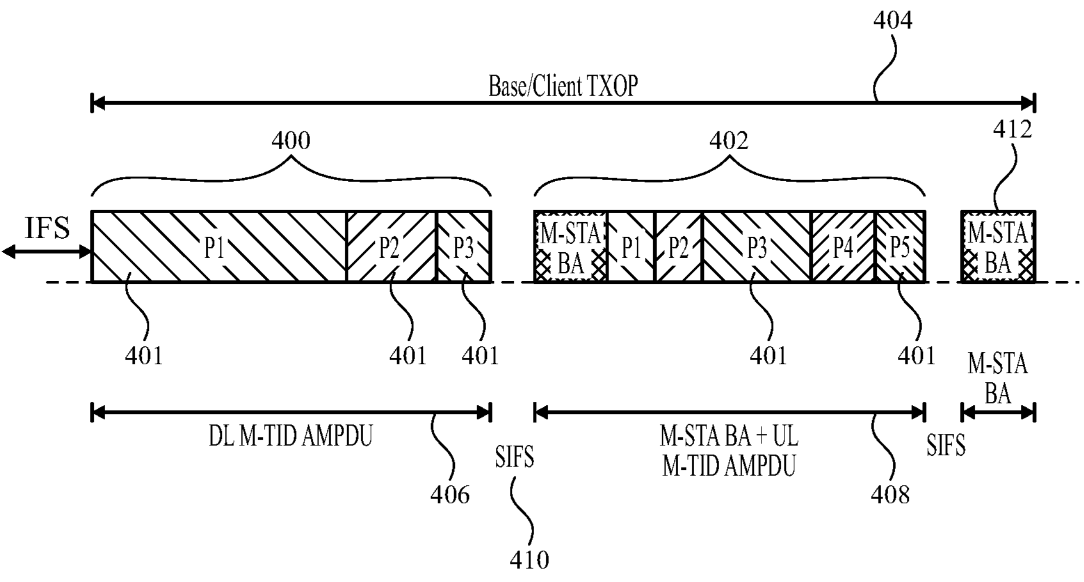
FIG. 4 illustrates example transmission units that can be generated by the electronic devices of FIG. 3 in accordance with one or more implementations.

In one or more implementations, aspects of the subject technology may facilitate low latency wireless communication between the electronic device 106 and the electronic device 104 and/or between one or more other device pairs on the same wireless (e.g., WiFi) channel. For example, FIG. 4 illustrates aspects of a low-latency, power-efficient, and Quality of Service aware WiFi protocol that can be used for point-to-point and multi-stream topology networks in accordance with aspects of the subject disclosure. The disclosed protocol can provide reduced latency communication for, as examples, low-latency gaming consoles, portable accessories with interactive user interfaces (UIs), and/or devices providing augmented reality, virtual reality, and/or mixed reality capabilities.

In the example of FIG. 4, a DL m-TID AMPDU 400 is transmitted within a transmission opportunity (TXOP) 404 and includes multiple data frames 401. In one or more implementations, each of the data frames 401 may be a frame of data for a corresponding one of multiple data streams. As examples, the multiple data streams may include an audio data stream, a video data stream, a metadata stream, one or more control streams, a best effort stream, one or more image streams, or the like.

As shown, the data frames 401 of the DL m-TID AMPDU 400 are ordered by priority (e.g., a first frame having a highest priority P1 is included first, followed by a second frame having a lower priority P2, and then third frame having a yet lower priority P3, in this example). In one or more implementations, an electronic device, such as the electronic device 106 may determine the priority of a frame using the QoS traffic category for the corresponding stream. For example, the priority (e.g., P1, P2, and P3, in this example) of each frame may be equal to, or otherwise based on, the numerical value (e.g., a numerical value between zero and seven) of the traffic identifier (TID) for the corresponding stream. For example, an audio frame may have a priority of seven (e.g., corresponding to the TID value of seven for an audio stream), and an image frame or video frame may have a priority of four (e.g., corresponding to the TID value of four for an image stream), with higher numbers indicating higher priority. In some examples, a metadata stream may have a priority of six (e.g., corresponding to the TID value of six for a metadata stream), and control frames may have priorities of between two and five (e.g., corresponding to the TID values of two, three, or five for control streams).

In accordance with one or more implementations, the data streams may be generated with a substantially fixed cadence that is set by the source of the data stream. As examples, audio and video streams may be generated with a fixed cadence that is between 30 Hz and 90 Hz, metadata streams may be generated with a fixed cadence that is between 16 Hz and 45 Hz, control frames may be generated with a fixed cadence that is between 6 Hz and 14 Hz and/or may be asynchronous, and/or image frames may be generated with a fixed cadence that is between 1 Hz and 10 Hz. In one or more implementations, each of the streams for which data is included in the DL m-TID AMPDU 400 may have an associated fixed maximum transmission unit (MTU) (e.g., which may be set by the source of the data). As examples, audio streams may have a fixed MTU value that is between 100 bytes and 1000 bytes, video streams may have a fixed MTU value that is between 1000 bytes and 2000 bytes, metadata streams may have a fixed MTU value that is between 100 bytes and 1000 bytes, control streams may have a fixed MTU value that is between 1000 bytes and 2000 bytes, and/or image streams may have a fixed MTU value that is between 1000 bytes and 2000 bytes (in one or more implementations). In one or more implementations, one or more of the data streams may have a corresponding bandwidth that is determined by the MTU and the cadence for this stream.

In one or more implementations, one or more of the data streams may have a fixed maximum latency (e.g., which may be set by the source of the data). As examples, audio streams may have a fixed maximum latency value that is between 10 milliseconds (ms) and 50 ms, video streams may have a fixed maximum latency value that is between 5 ms and 100 ms, metadata streams may have a fixed maximum latency value that is between 50 ms and 100 ms, control streams may have a fixed maximum latency value that is between 50 ms and 200 ms, and image streams may have a maximum latency of between 50 ms and 200 ms (in one or more implementations). In one or more implementations, a data stream with a low maximum latency and a relatively high priority, can be transmitted with sufficiently low latency by ordering the streams by priority, as described herein.

As shown in FIG. 4, following an interframe space 410 (e.g., a Short Interframe Space (SIFS)), an electronic device such as the electronic device 104 may respond to the DL m-TID AMPDU 400 by generating and transmitting an UL m-TID AMPDU 402 in the same TXOP 404. As shown, the response may also include a block acknowledgement (BA), such as a multi-station (m-STA) BA of the DL m-TID AMPDU 400. In one or more implementations, the base device transmitting the DL m-TID AMPDU 400 may contend for access to the channel, and the client device transmitting the UL m-TID AMPDU 402 may transmit only in response to the communication from the base device (e.g., in response to a Reverse Direction Grant (RDG) trigger from the base device).

As shown, the electronic device 106 may also send a m-STA BA 412 to the electronic device 104 responsive to receiving the UL m-TID AMPDU 402. As shown, the UL m-TID AMPDU 402 may use the same priority protocol as the DL m-TID AMPDU 400, and may include multiple data frames 401 that follow the BA in order of priority (e.g., P1, then P2, then P3, then P4, then P5 in this example). In one or more implementations, the DL m-TID AMPDU 400 and/or the UL m-TID AMPDU 402 may each include as many as eight data frames (e.g., corresponding to eight data streams), up to a maximum duration 406 for the DL m-TID AMPDU 400 and a maximum duration 408 for the UL m-TID AMPDU 402 including the BA.

Ordering the data frames 401 by priority as shown can help reduce latency while meeting WiFi QoS requirements, such as by ensuring that the highest priority streams are always transmitted. In one or more implementations, if a relatively lower priority frame cannot be included in a transmission with the higher priority frames because the relatively lower frame would extend the AMPDU beyond the maximum duration, the relatively lower priority frame can be transmitted in a subsequent AMPDU or can be dropped. In one or more implementations, TXOP bursting may be performed if the wireless channel is available after the DL m-TID AMPDU 400 and the UL m-TID AMPDU 402, up until the end of the TXOP 404 (e.g., on acknowledged transactions only).

Figure 5:
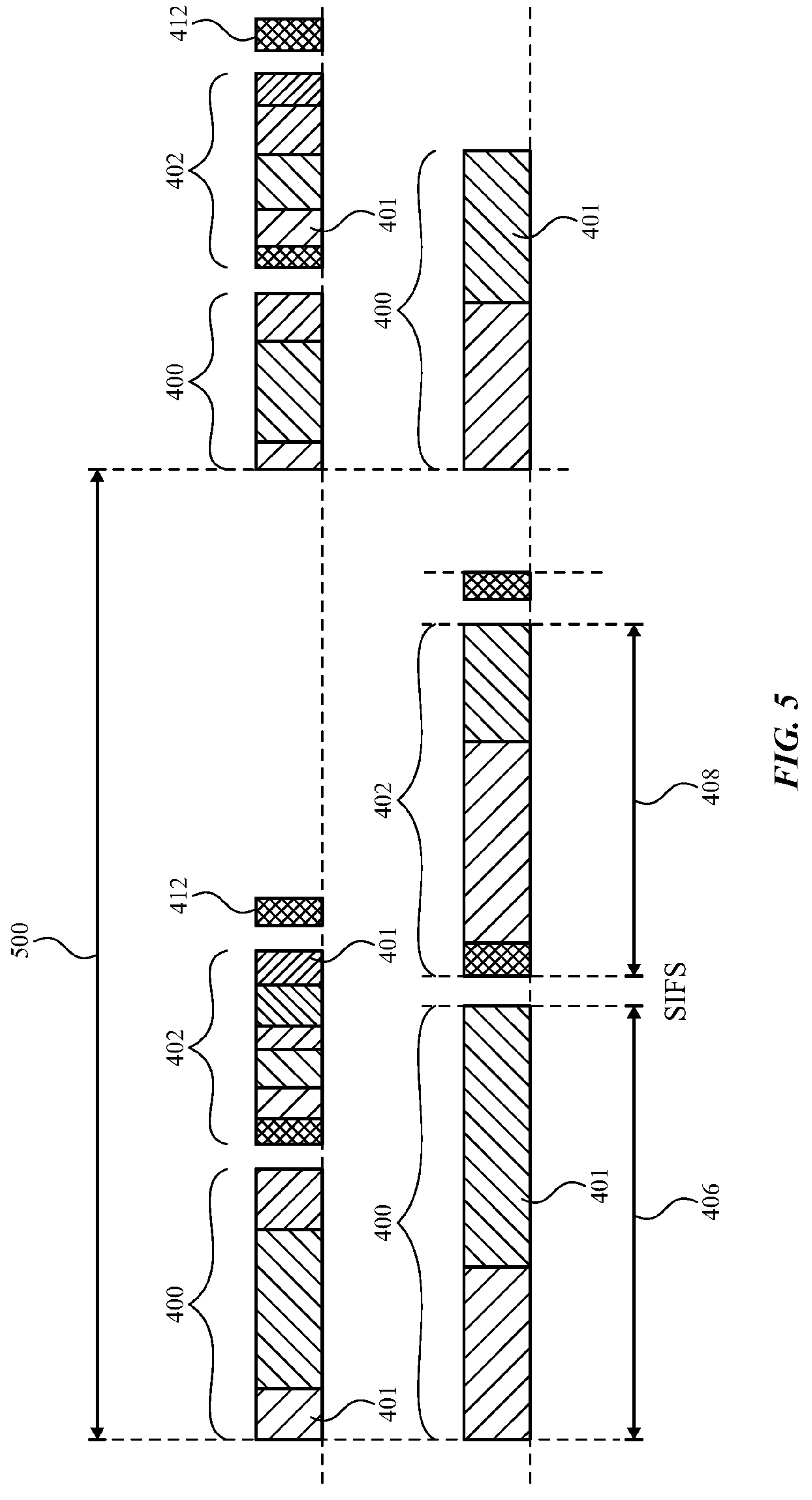
FIG. 5 illustrates an example periodic access window for wireless communication in accordance with one or more implementations.

In one or more implementations, electronic devices communicating using the disclosed protocol (e.g., including by exchanging priority-ordered transmission units, such as the DL m-TID AMPDUs 400 and/or UL m-TID AMPDUs 402 as described herein) may transmit within periodic access windows that are spaced apart by a predetermined interval. For example, FIG. 5 illustrates exchanges of various DL m-TID AMPDUs 400 and UL m-TID AMPDUs 402 of varying durations (each less than or equal to the maximum durations 406 and 408 respectively), in which each DL m-TID AMPDU 400 from a device is transmitted following a predetermined duration 500 after the beginning of the prior DL m-TID AMPDU 400 from that device.

Figure 6:
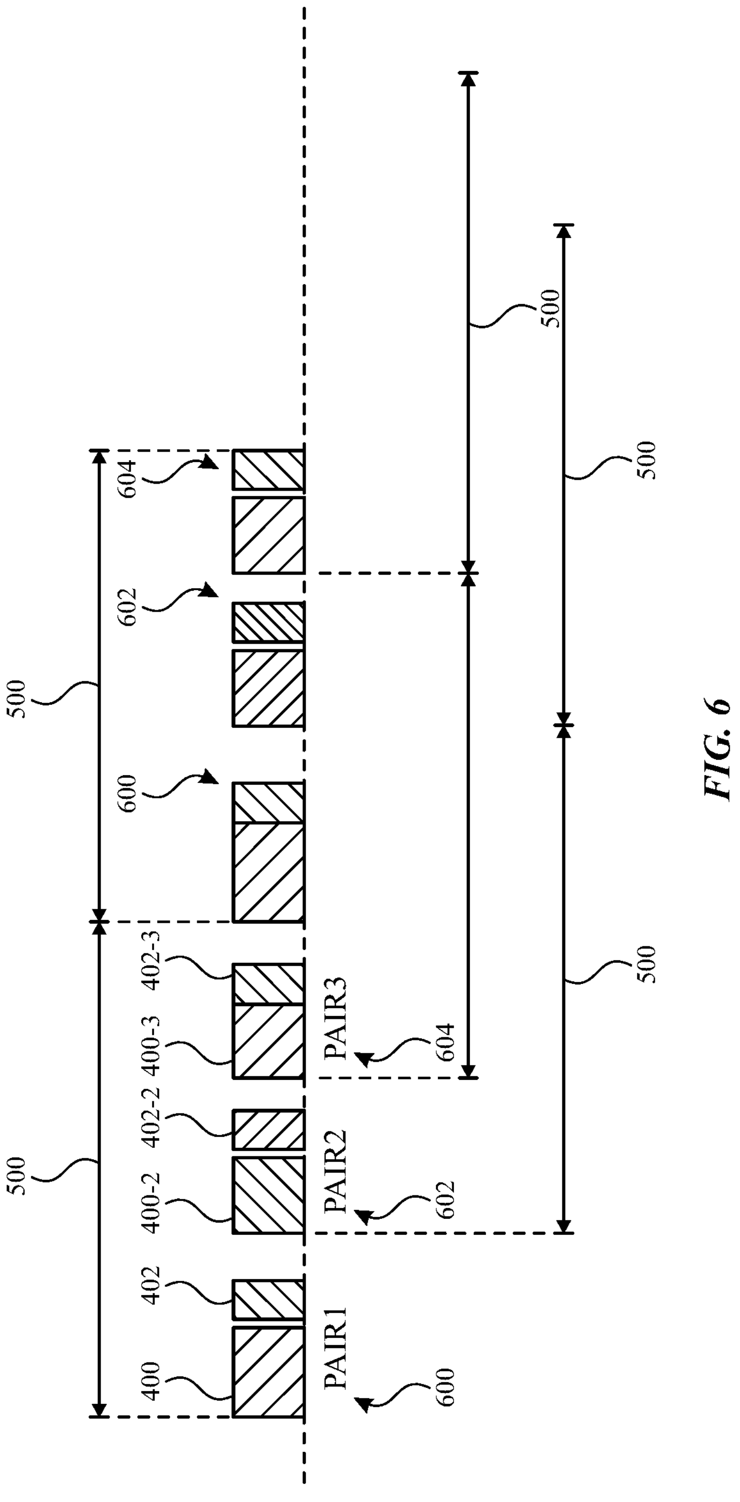
FIG. 6 illustrates an example of wireless communication between multiple device pairs over a wireless channel in accordance with one or more implementations.

Limiting the length of the DL m-TID AMPDU 400 and the UL m-TID AMPDU 402 to the respective maximum durations 406 and 408, and spacing the DL m-TID AMPDU 400 transmissions by the predetermined duration 500, may allow multiple device pairs to co-exist on the same wireless channel. For example, FIG. 6 illustrates a use case in which DL m-TID AMPDUs 400 and UL m-TID AMPDUs 402 are exchanged by a first device pair 600 of electronic devices (e.g., a device pair including the electronic device 106 and the electronic device 104, which may be referred to as "Pair1" in some examples) once every predetermined duration 500, DL m-TID AMPDUs 400-2 and UL m-TID AMPDUs 402-2 are exchanged by a second device pair 602 of electronic devices (e.g., Pair2) once every predetermined duration 500, and DL m-TID AMPDUs 400-3 and UL m-TID AMPDUs 402-3 are exchanged by a third pair 604 of electronic devices (e.g., Pair3) once every predetermined duration 500, with the communication of each device pair interleaved with the communication of the other device pairs, on the same wireless channel by offsetting the predetermined durations of the respective pairs. Each of the DL m-TID AMPDUs 400-2, the UL m-TID AMPDUs 402-2, the DL m-TID AMPDUs 400-3, and the UL m-TID AMPDUs 402-3 may include multiple frames ordered by priority, as described above in connection with the DL m-TID AMPDUs 400 and UL m-TID AMPDUs 402 of FIG. 4.

Figure 7:
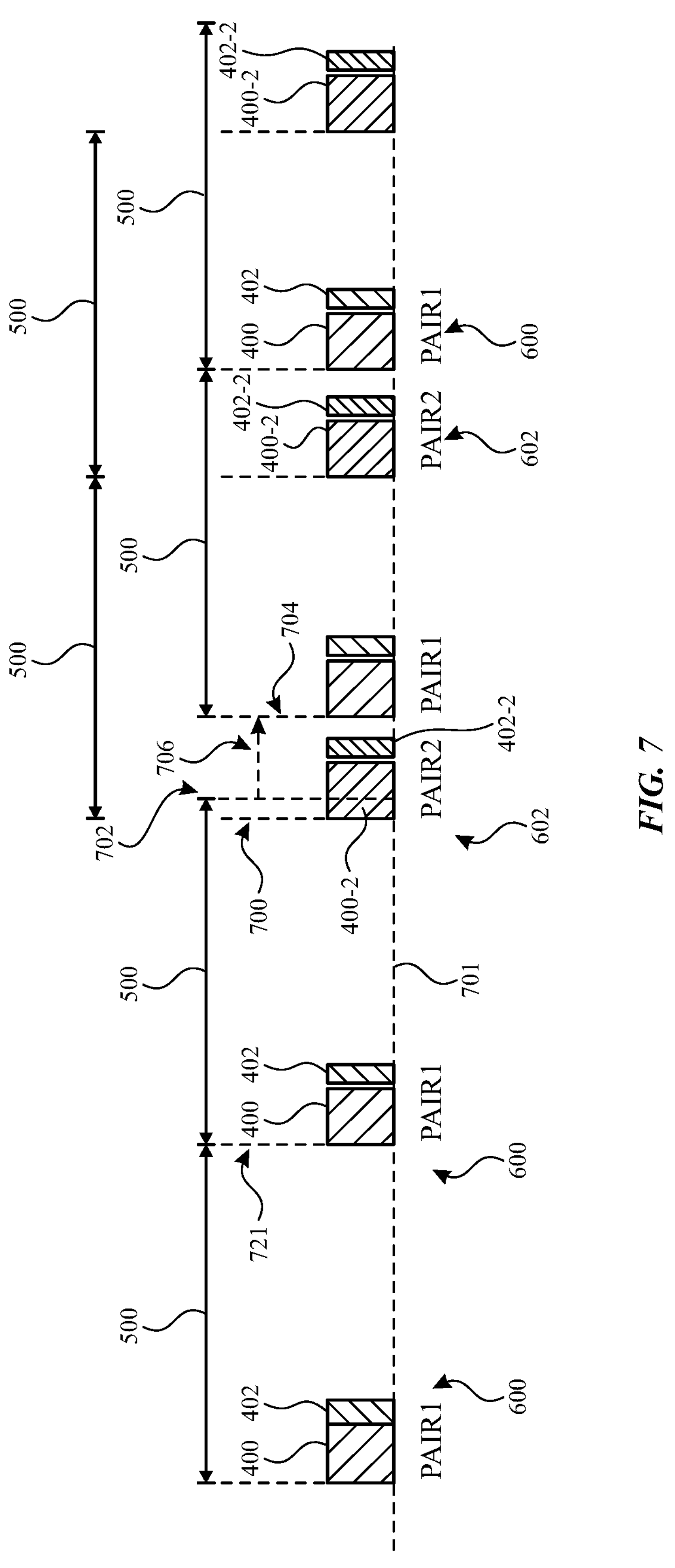
FIG. 7 illustrates an example of an adaptive offset to a periodic access window in accordance with one or more implementations.

In one or more implementations, the periodic access windows that are spaced apart by the predetermined duration 500 may be adaptively adjusted (e.g., shifted or offset without changing the duration) to accommodate new device pairs on the channel. For example, FIG. 7 illustrates a use case in which the first device pair 600 is exchanging communication (e.g., a DL m-TID AMPDU 400 and an UL m-TID AMPDU 402, each with multiple priority-ordered frames) every predetermined duration 500, and a DL m-TID AMPDU 400-2 (e.g., a first DL m-TID AMPDU 400-2) of the second device pair 602 of FIG. 6 is transmitted on the wireless channel 701. In this example, the transmission of the DL m-TID AMPDU 400-2 begins at a time 700 and extends beyond the time 702 at which the first device pair 600 would be attempting to transmit next DL m-TID AMPDU 400 at the start of a new periodic access window that begins a predetermined duration 500 after the time 721 of the transmission of a prior DL m-TID AMPDU 400 of the first device pair 600.

In the example of FIG. 7, the first device pair 600 (e.g., the electronic device 106 of the first device pair 600) determines that the wireless channel 701 is not available at the time 702, and waits (e.g., an offset time 706) until the wireless channel 701 is free to transmit the next DL m-TID AMPDU 400 to the other device of the first device pair 600 (e.g., to the electronic device 104). As shown, the other device of the first device pair 600 may then respond with an UL m-TID AMPDU 402, and thereafter the first device pair 600 exchanges communication every predetermined duration 500 from the time 704 that is offset from the time 702 by the offset time 706. In one or more implementations, the first device (e.g., the base device, such as the electronic device 106) of a pair may transmit offset information indicating the offset time 706 to the second device (e.g., the client device, such as the electronic device 104), so that the second device knows when the next periodic access window begins and to wake up and listen for a downlink communication from the first device of the pair. For example, the offset may be advertised by a base device in a next downlink transmission to the client.

Limiting the maximum uplink duration and the maximum downlink duration for each pair to the respective maximum durations 406 and 408, which combined may be no more than the predetermined duration 500, may help ensure that time on the wireless channel 701 remains available for other device pairs (e.g., even after the second device pair 602 joins the channel).

In the example of FIG. 7, the first device pair 600 is already communicating on the wireless channel 701 when the second device pair 602 joins, and the first device pair 600 (e.g., and/or one or more other device pairs that may also be already communicating on the wireless channel 701) waits for the newly joined second device pair 602 to complete a communication and free the channel before starting a new round of communication. In this example, the device pairs on the channel offset their periodic availability windows (e.g., without changing the predetermined duration 500 of each window) to accommodate a new device pair on the channel. However, in other implementations, the second device pair 602 may attempt to identify a time when the wireless channel 701 is free before sending a first communication and establishing its periodic availability window), so that a newly joining device pair offsets its communication windows without disturbing the periodic availability windows of one or more device pairs that are already communicating on the wireless channel 701. In one or more implementations, the devices of a device pair may perform a timer synchronization operation (e.g., using a WiFi target wake time (TWT) protocol).

Providing adjustable periodic access windows as described in connection with FIG. 7 may facilitate a time synchronization between several device pairs (e.g., without exchanging inter-pair communication), may help to decrease end-to-end latency and packet loss ratios, and/or account for normal jitter due to air access (e.g., by requiring the offset duration to be greater than a minimum value). In one or more implementations, an offset time 706 for a given pair may be updated at most once every configurable time.

Figure 8:
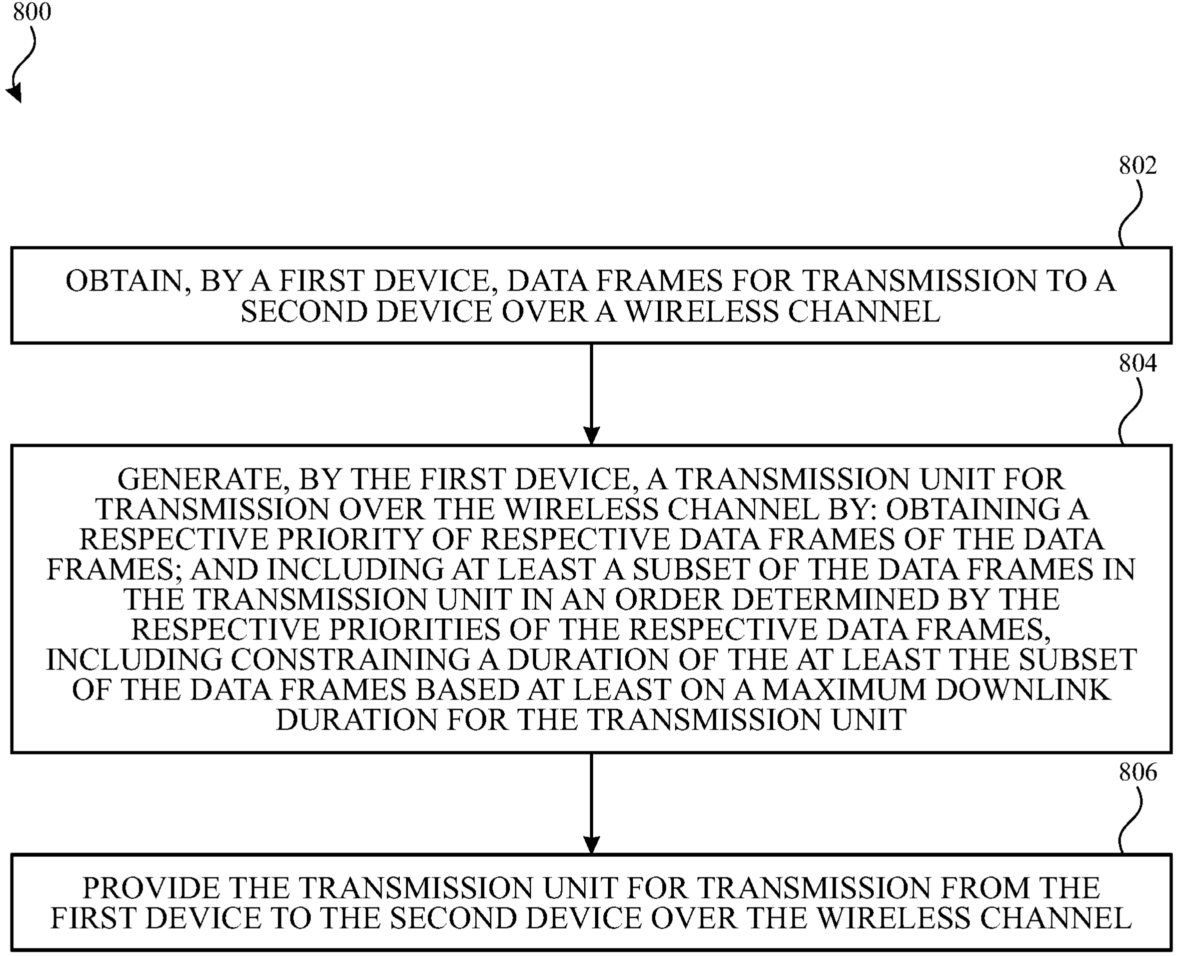
FIG. 8 illustrates a flow diagram of an example process that can be performed for low latency wireless communication in accordance with one or more implementations.

FIG. 8 illustrates a flow diagram of an example process 800 for wireless communication such as point-to-point communication in accordance with one or more implementations. For explanatory purposes, the process 800 is primarily described herein with reference to the electronic device 104 and the electronic device 106 of FIG. 1. However, the process 800 is not limited to the electronic device 104 and the electronic device 106 of FIG. 1, and one or more blocks (or operations) of the process 800 may be performed by one or more other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a first device (e.g., electronic device 106) may obtain data frames (e.g., data frames 401) for transmission to a second device (e.g., electronic device 104) over a wireless channel (e.g., wireless channel 701). The data frames may each include data for a corresponding data stream between the first device and the second device. The data streams may be generated by the first device (e.g., by an application running on the first device). The data frames may include, as examples, frames of video data, audio data, metadata, control data, or any other media data and/or streaming data. In various implementations, the first device may be a base device obtaining data frames for a downlink transmission to the second device, or may be a client device obtaining data frames for an uplink response to a downlink transmission from the second device.

At block 804, the first device may generate a transmission unit for transmission (e.g., to the second device) over the wireless channel. Generating the transmission unit may include obtaining a respective priority of respective data frames of the data frames, and including at least a subset of the data frames in the transmission unit in an order determined by the respective priorities of the respective data frames. Including the subset of the data frames in the transmission unit may include constraining a duration of the at least the subset of the data frames based on (e.g., to be within) a maximum downlink duration (e.g., maximum duration 406) for the transmission unit. In one or more implementations, the transmission unit is a multi-traffic identifier aggregate media access control protocol data unit (m-TID AMPDU), such as DL m-TID AMPDU 400 or UL m-TID AMPDU 402 as described herein. In one or more implementations, obtaining the respective priority of respective data frames of the data frames may include obtaining respective a traffic identifier (TID) for each respective data frame of the data frames. For example, the TID may have a numerical value of between zero and seven, and may correspond to a QoS category.

In one or more implementations, constraining the duration of the at least the subset of the data frames based on the maximum downlink duration for the transmission unit may include, by the first device: determining that less than all of the data frames will fit within the maximum downlink duration (e.g., by determining that that a combined duration of the data frames is longer or greater than the maximum downlink duration); determining, based on the obtained priorities, a lowest priority data frame of the data frames; and omitting the lowest priority data frame from the transmission unit. In some use cases, more than one of the data frames may be omitted from the transmission unit. By including data frames in the transmission unit in the order determined by the priority and up to the maximum downlink duration, the electronic device can help ensure that the highest priority data frames (e.g., the data frames that most effect the QoS of the transmission) are included in the transmission units, and that the wireless channel can be used by other device pairs (e.g., even without communication between the pairs and/or without a central scheduling authority for the channel).

At block 806, the first device may provide the transmission unit for transmission (e.g., to the second device) over the wireless channel. The first device may also transmit the transmission unit to the second device over the wireless channel. In one or more implementations, the first device may also receive a response transmission unit (e.g., an UL m-TID AMPDU, such as UL m-TID AMPDU 402 as described herein) from the second device. The response transmission unit may have a duration that is no more than a maximum uplink duration (e.g., maximum duration 408), and may include an acknowledgement (e.g., a block acknowledgement (BA), such as a m-STA BA) of the transmission unit, and an additional plural priority-ordered data frames (e.g., as discussed herein in connection with FIG. 4).

In one or more implementations, the first device may wait at least a predetermined duration (e.g., predetermined duration 500) after transmitting the transmission unit, and attempt to transmit a subsequent transmission unit (e.g., a subsequent DL m-TID AMPDU 400) from the first device (e.g., to the second device) after the waiting (e.g., after at least the predetermined duration). In one or more implementations, the predetermined duration is longer than a combination of the maximum downlink duration and the maximum uplink duration. In some examples, such as when the wireless channel is free, the first device may also transmit the subsequent transmission unit from the first device (e.g., to the second device) after the predetermined duration (e.g., as described herein in connection with FIGS. 5, 6, and 7).

In one or more implementations, the first device may determine that the wireless channel is busy at the end of the predetermined duration, and transmit the subsequent transmission unit from the first device (e.g., to the second device) when the wireless channel becomes available after an offset time (e.g., offset time 706) after (e.g., following the end of) the predetermined duration (e.g., as described above in connection with FIG. 7). In one or more implementations, the first device may also generate a notification of the offset time for the second device. The first device may also send the offset time to the second device. In one or more implementations, the first device may also wait at least the predetermined duration after transmitting the subsequent transmission unit, and transmit a further subsequent transmission unit (e.g., a further subsequent DL m-TID AMPDU 400) from the first device (e.g., to the second device) following the predetermined duration following transmitting the subsequent transmission unit (e.g., as described above in connection with FIG. 7).

As discussed herein in connection with, for example, FIG. 4, an electronic device (e.g., electronic device 104) that receives a transmission unit such as a DL m-TID AMPDU 400 may respond by generating and sending a response transmission unit, such as an UL m-TID AMPDU 402. For example, an electronic device may receive a transmission unit (e.g., a DL m-TID AMPDU 400) having priority-ordered data frames (e.g., data frames 401), a duration that is no more than a maximum downlink duration (e.g., a maximum duration 406), and a trigger (e.g., an RDG trigger). Responsive to the trigger, the electronic device may generate a response transmission unit (e.g., a UL m-TID AMPDU 402) that includes different priority-ordered data frames and has a duration that is no more than a maximum uplink duration (e.g., maximum duration 408). The electronic device may also provide the response transmission unit for transmission (e.g., and transmit the response transmission unit to the device that sent the transmission unit).

In one or more implementations, the response transmission unit is a multi-traffic identifier aggregate media access control protocol data unit. In one or more implementations, generating the response transmission unit that includes the different priority-ordered data frames includes obtaining a respective priority of each respective data frame of the different priority-ordered data frames. In one or more implementations, obtaining the respective priority of each respective data frame of the different priority-ordered data frames includes obtaining a traffic identifier (e.g., a TID) of each respective data frame of the different priority-ordered data frames In one or more implementations, the electronic device may also include an acknowledgement (e.g., an m-STA BA) of the transmission unit in the response transmission unit. In one or more implementations, the electronic device may transmit the response transmission unit, wait at least a predetermined duration (e.g., predetermined duration 500) following transmitting the response transmission unit, and attempt to transmit a subsequent response transmission unit following the predetermined duration. In one or more implementations, the predetermined duration exceeds a combination of the maximum downlink duration and the maximum uplink duration. In one or more implementations, electronic device may also receive an offset time (e.g., an offset time 706, as described in connection with FIG. 7).

In one or more implementations, the electronic device may generate the response transmission unit that includes the different priority-ordered data frames and has the duration that is no more than a maximum uplink duration by: determining that a combined duration of the different priority-ordered data frames exceeds the maximum uplink duration; determine, based on the obtained priorities, a lowest priority data frame of the different priority-ordered data frames, and omit the lowest priority data frame and/or one or more additional relatively low priority data frames from the response transmission unit. In one or more implementations, the electronic device may receive the transmission unit over a wireless channel during a transmission opportunity (TXOP) associated with the wireless channel, and transmit the response transmission unit during the same TXOP and without determining whether the wireless channel is free (e.g., as described above in connection with FIG. 4). Including the transmission unit and the response transmission unit within one TXOP as described herein allows an electronic device that receives a transmission unit, such as a priority-ordered m-TID AMPDU, to immediately respond without having to listen and wait for the wireless channel to clear. In this way, the subject technology facilitates low latency, lower power, faster turnaround communication, and facilitates co-existence among other peer-to-peer pairs on the same wireless channel without centralized control and scheduling.

Aspects of the subject technology (e.g., including priority ordering, maximum UL and DL durations, and offsetable fixed duration periodic access windows) have been shown, via simulations, to provide efficient communication for point-to-point latency-sensitive applications, even in network congested conditions, and/or when multiple device pairs use the same medium. This demonstrated efficiency includes efficiencies in performance metrics including end-to-end latency, channel bandwidth utilization, collision ratio, and average power consumption.

Aspects of the present technology may include the gathering and use of data available from specific and legitimate sources for low-latency wireless communication. The present disclosure contemplates that in some instances, this gathered data may include personal information data that uniquely identifies or can be used to identify a specific person. Such personal information data can include image data, video data, audio data, demographic data, location-based data, online identifiers, telephone numbers, email addresses, home addresses, device identifiers, data or records relating to a user's health or level of fitness (e.g., vital signs measurements, medication information, exercise information, EMG signals), date of birth, or any other personal information.

The present disclosure recognizes that the use of such personal information data, in the present technology, can be used to the benefit of users. For example, the personal information data can be used for providing low-latency wireless communication. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the case of providing low-latency wireless communication, the present technology can be configured to allow users to select to “opt in” or “opt out” of participation in the collection of personal information data during registration for services or anytime thereafter. In addition to providing “opt in” and “opt out” options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
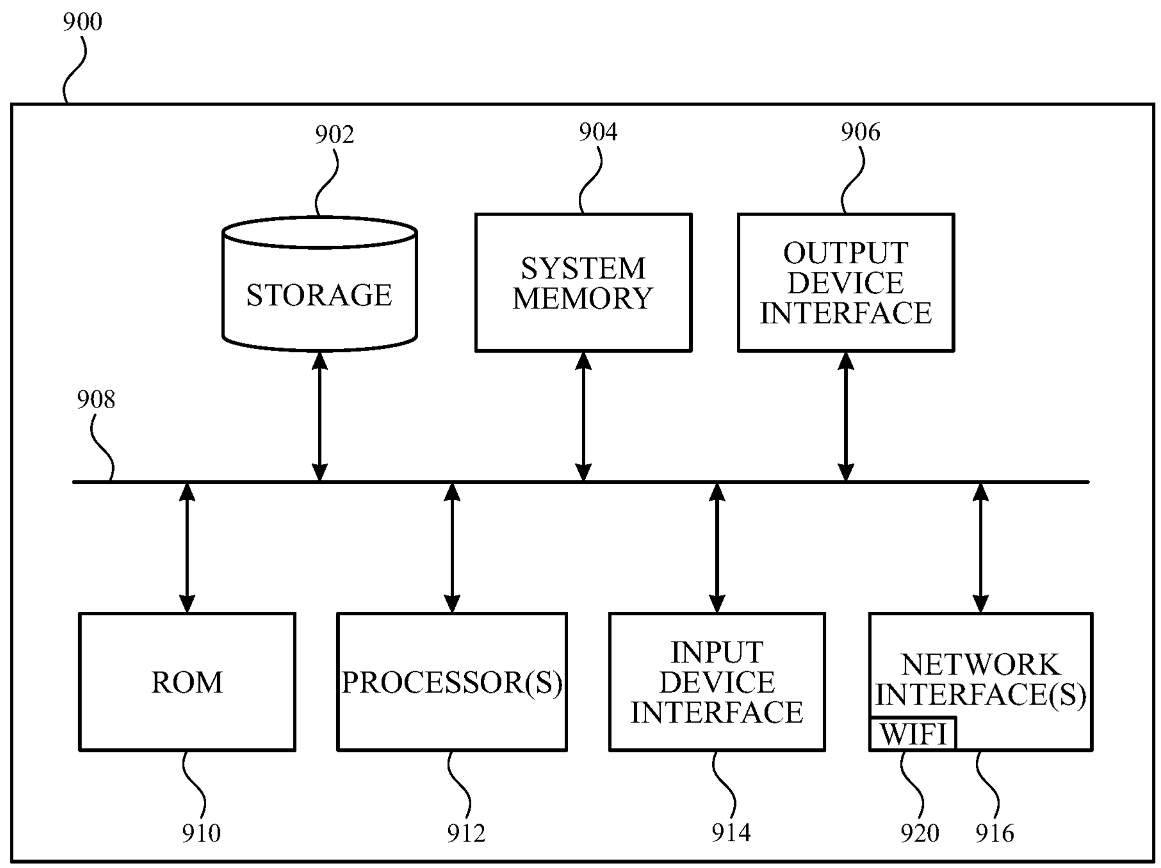
FIG. 9 illustrates an example electronic system with which aspects of the subject technology may be implemented in accordance with one or more implementations.

FIG. 9 illustrates an electronic system 900 with which one or more implementations of the subject technology may be implemented. The electronic system 900 can be, and/or can be a part of, one or more of the electronic devices 102-107, the content provider 112 and/or the cloud-based service 114 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called “cursor control devices”). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the content provider 112 shown in FIG. 1, through the one or more network interface(s) 916. As shown in FIG. 9, the network interface(s) 916 may include a WiFi communications interface (e.g., WiFi module 920, which may include one or more WiFi antennas and/or front end circuitry configured to receive and transmit wireless signals in one or more WiFi channels as discussed herein). The network interface(s) 916 may also include one or more of a Bluetooth communication interface, a cellular interface, an NFC interface, a Zigbee communication interface, a WLAN communication interface, a USB communication interface, or generally any communication interface. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

In accordance with aspects of the disclosure, a method is provided that includes obtaining, by a first device, data frames for transmission to a second device over a wireless channel; generating, by the first device, a transmission unit for transmission over the wireless channel by: obtaining a respective priority of respective data frames of the data frames; and including at least a subset of the data frames in the transmission unit in an order determined by the respective priorities of the respective data frames, including constraining a duration of the at least the subset of the data frames based on a maximum downlink duration for the transmission unit; and providing the transmission unit for transmission from the first device over the wireless channel.

In accordance with aspects of the disclosure, a non-transitory machine-readable medium is provided storing instructions that, when executed by one or more processors, cause the one or more processors to perform operations that include obtaining, by a first device, data frames for transmission to a second device over a wireless channel; generating, by the first device, a transmission unit for transmission over the wireless channel by: obtaining a respective priority of respective data frames of the data frames; and including at least a subset of the data frames in the transmission unit in an order determined by the respective priorities of the respective data frames, including constraining a duration of the at least the subset of the data frames based on a maximum downlink duration for the transmission unit; and providing the transmission unit for transmission from the first device over the wireless channel.

In accordance with aspects of the disclosure, an electronic device is provided that includes memory, and one or more processors, where the one or more processors are configured to obtain a plurality of data frames for transmission to an other device over a wireless channel; generate a transmission unit for transmission to the other device over the wireless channel by: obtain a priority of each of the data frames; include at least some of the plurality of data frames in the transmission unit in an order determined by the priority and up to a maximum downlink duration for the transmission unit; and transmit the transmission unit to the other device over the wireless channel.

In accordance with aspects of the disclosure, an electronic device is provided that includes memory, and one or more processors, where the one or more processors are configured to receive a transmission unit having priority-ordered data frames, a duration no more than a maximum downlink duration, and a trigger; responsive to the trigger, generate a response transmission unit that includes different priority-ordered data frames and has a duration no more than a maximum uplink duration; and provide the response transmission unit for transmission Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

obtaining, by a first device, data frames for transmission to a second device over a wireless channel, wherein the first device and the second device are a first device pair;

generating, by the first device, a transmission unit for transmission over the wireless channel by:

obtaining a respective priority of respective data frames of the data frames; and including at least some of the data frames in the transmission unit in an order determined from the respective priorities of the respective data frames, wherein the including comprises constraining a duration of the transmission unit by selecting the at least some of the data frames based at least on a maximum downlink duration for the transmission unit providing the transmission unit for transmission from the first device over the wireless channel;

waiting at least a predetermined duration after transmitting the transmission unit from the first device, wherein the predetermined duration is longer than a combination of the maximum downlink duration and a maximum uplink duration for a response to the transmission unit from the second device; and attempting to transmit a subsequent transmission unit after the waiting, wherein the first device constraining the duration of the transmission unit maintains a portion of the predetermined duration for transmissions associated with one or more other device pairs on the wireless channel, without inter-pair communication between the first device pair and the one or more other device pairs.

2. The method of claim 1, wherein the transmission unit comprises a multi-traffic identifier aggregate media access control protocol data unit.

3. The method of claim 2, wherein the obtaining the respective priority of respective data frames of the data frames comprises obtaining a respective traffic identifier for each respective data frame of the data frames.

4. The method of claim 1, further comprising receiving a response transmission unit having a duration less than the maximum uplink duration from the second device at the first device, wherein the response transmission unit comprises priority-ordered data frames and an acknowledgement of the transmission unit.

5. The method of claim 4, further comprising, with the first device:

transmitting the transmission unit from the first device.

6. The method of claim 5, further comprising, by the first device:

determining that the wireless channel is busy at an end of the predetermined duration;

waiting to transmit the subsequent transmission unit from the first device until the wireless channel becomes available after a predetermined offset time after the predetermined duration; and providing a notification of the predetermined offset time to the second device.

7. The method of claim 6, further comprising, by the first device:

transmitting the subsequent transmission unit from the first device after the predetermined offset time following the predetermined duration;

waiting the predetermined duration after transmitting the subsequent transmission unit; and transmitting, from the first device, a further subsequent transmission unit after the predetermined duration following transmitting the subsequent transmission unit.

8. The method of claim 1, wherein constraining the duration of the transmission unit by selecting the at least some of the data frames to be within the maximum downlink duration for the transmission unit includes, by the first device:

determining that a duration of all of the data frames is greater than the maximum downlink duration;

determining, based on the obtained priorities, a lowest priority data frame, other than the at least some of the data frames; and omitting the lowest priority data frame from the transmission unit.

9. The method of claim 3, wherein:

the respective traffic identifier for each respective data frame of the data frames comprises a respective numerical value, and obtaining the respective priority of the respective data frames of the data frames comprises assigning, as a respective priority value for each respective data frame of the data frames, the respective numerical value corresponding to the respective traffic identifier for that data frame.

10. An electronic device, comprising:

memory;

communications circuitry; and one or more processors, wherein the one or more processors are configured to:

receive, from an other device using the communications circuitry over a wireless channel during a transmission opportunity associated with the wireless channel, a transmission unit having priority-ordered data frames that are ordered within the transmission unit according to priorities for the priority-ordered data frames, a duration no more than a maximum downlink duration, and a trigger;

responsive to the trigger, generate a response transmission unit that includes different priority-ordered data frames and is constrained to a duration no more than a maximum uplink duration;

provide the response transmission unit for transmission;

operate the communications circuitry to transmit the response transmission unit during the transmission opportunity and without determining whether the wireless channel is free;

wait at least a predetermined duration after transmitting the response transmission unit, wherein the predetermined duration is longer than a combination of the maximum downlink duration and the maximum uplink duration, and wherein the electronic device and the other device are a first device pair; and attempt to transmit a subsequent response transmission unit after waiting the predetermined duration, wherein the electronic device constraining the duration of the response transmission unit allows, during the predetermined duration and without inter-pair communication between the first device pair and a second device pair, communication on the wireless channel between the second device pair to be interleaved with communication between the first device pair.

11. The electronic device of claim 10, wherein the response transmission unit comprises a multi-traffic identifier aggregate media access control protocol data unit.

12. The electronic device of claim 11, wherein generating the response transmission unit that includes the different priority-ordered data frames comprises obtaining a respective priority of each respective data frame of the different priority-ordered data frames.

13. The electronic device of claim 12, wherein obtaining the respective priority of each respective data frame of the different priority-ordered data frames comprises obtaining a traffic identifier of each respective data frame of the different priority-ordered data frames.

14. The electronic device of claim 12, wherein the one or more processors are configured to generate the response transmission unit by:

determining that a combined duration of a plurality of the different priority-ordered data frames exceeds the maximum uplink duration;

determining, based on the obtained priorities, a lowest priority data frame of the different priority-ordered data frames; and omitting the lowest priority data frame from the response transmission unit.

15. The electronic device of claim 10, wherein the one or more processors are further configured to include an acknowledgement of the transmission unit in the response transmission unit.

16. The electronic device of claim 10, wherein the one or more processors are further configured to receive an offset time.

17. A non-transitory machine-readable medium storing instructions that, when executed by one or more processors, cause the one or more processors to perform operations that include:

obtaining, by a first device, data frames for transmission to a second device over a wireless channel, wherein the first device and the second device are a first device pair;

generating, by the first device, a transmission unit for transmission over the wireless channel by:

obtaining a respective priority of respective data frames of the data frames by obtaining a respective traffic identifier for each respective data frame of the data frames; and including at least at least some of the data frames in the transmission unit in an order determined from the respective priorities of the respective data frames, wherein the including comprises constraining a duration of the transmission unit by selecting the at least some of the data frames based on a maximum downlink duration for the transmission unit;

providing the transmission unit for transmission from the first device over the wireless channel;

waiting at least a predetermined duration after transmitting the transmission unit from the first device, wherein the predetermined duration is longer than a combination of the maximum downlink duration and a maximum uplink duration for a response to the transmission unit from the second device; and attempting to transmit a subsequent transmission unit after the waiting, wherein the first device constraining the duration of the transmission unit maintains a portion of the predetermined duration for transmissions associated with one or more other device pairs on the wireless channel, without inter-pair communication between the first device pair and the one or more other device pairs.

* * * * *